United States Patent [19]
Fischer

[11] 3,960,460
[45] June 1, 1976

[54] CONNECTOR FOR ELEMENTS MADE OF STRUCTURAL FOAM

[76] Inventor: Artur Fischer, Altheimer Strasse 219, D-7241 Tumlingen, Germany

[22] Filed: July 11, 1974

[21] Appl. No.: 487,806

[30] Foreign Application Priority Data
July 14, 1973 Germany............................ 2335908

[52] U.S. Cl................................ 403/292; 52/585; 52/753 E; 403/306; 403/406
[51] Int. Cl.².................... F16B 7/00; F16B 5/00; F16B 12/24; F16B 13/12
[58] Field of Search.......... 52/753 K, 753 C, 753 D, 52/753 R, 758 D, 758 R, 753 T, 753 E; 403/292, 306; 85/19

[56] References Cited
UNITED STATES PATENTS
| | | | |
|---|---|---|---|
| 1,440,064 | 12/1922 | Donnelly.......................... | 403/292 X |
| 1,951,711 | 3/1934 | Stitt.................................. | 52/753 R |
| 3,477,334 | 11/1969 | Stone et al......................... | 85/19 X |
| 3,563,582 | 2/1971 | Shroyer............................. | 52/585 X |

*Primary Examiner*—Werner H. Schroeder
*Assistant Examiner*—Wayne L. Shedd
*Attorney, Agent, or Firm*—Michael J. Striker

[57] ABSTRACT

Elements of structural foam are connected by pushing into each of them a substantially blade-shaped portion of a connector, which portion has at least one transverse hole, whereupon a nail-like or similar member is pushed into the structural-foam element so as to traverse the hole and lock the blade-shaped portion in the structural-foam element. The blade-shaped portions are connected with one another. A connector for carrying out the method is also disclosed.

6 Claims, 2 Drawing Figures

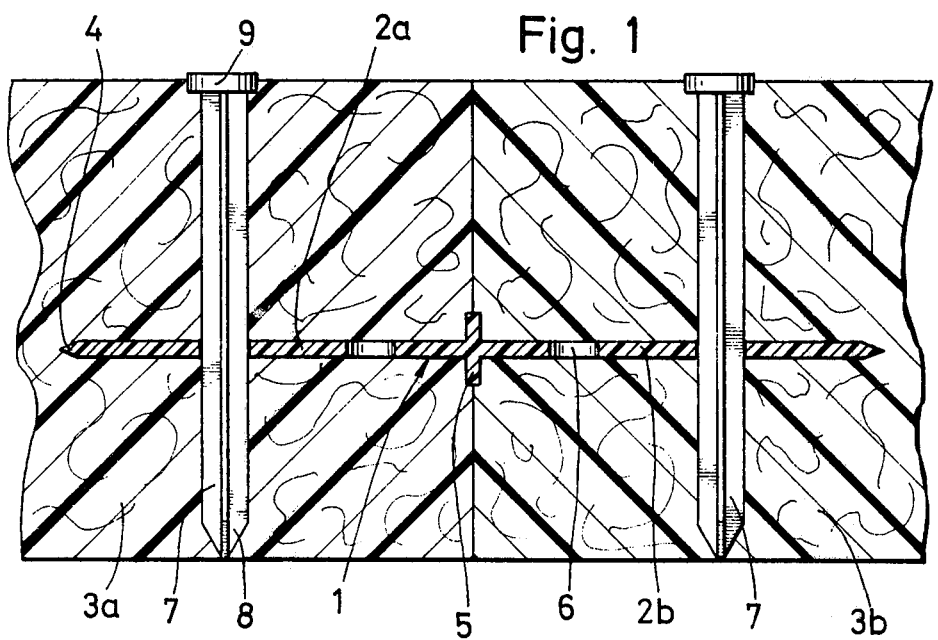
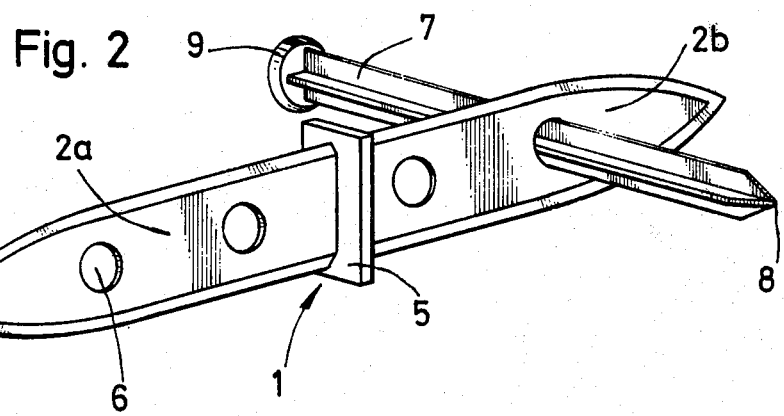

CONNECTOR FOR ELEMENTS MADE OF STRUCTURAL FOAM

BACKGROUND OF THE INVENTION

The present invention relates generally to the connection of elements made of structural foam, and more particularly to a method of connecting such elements made of structural foam, and to a connector for carrying out the method.

The use of elements made of structural foam is becoming increasingly widespread. The term "structural foam" refers to synthetic plastic foam material of the rigid or near-rigid type, of which "Styrofoam" is an example.

One of the areas where this type of structural foam, so-called because it is possible to make structures of it, building elements, and the like — is very widely used, and with respect to which the invention will be explained hereafter, is in the toy industry. It is very common to use structural foam to simulate landscapes, buildings and the like. Heretofore, when it was necessary to connect elements of structural foam with one another, this was done by use of an adhesive. However, especially in the case of toy structures it is desired that a playing child be able to arrange the various components in many ways according to his particular wishes. If two structural-foam elements are connected with one another by means of an adhesive, they cannot subsequently be separated without damaging them. For example, if a landscape arrangement is involved, it is not subsequently possible to detach a foam element simulating a mountain from a base, and move it to another location. This is particularly objectionable in the case where such structural-foam elements are a part of or used in conjunction with a type of toy building set having a variety of components that can be assembled in different ways to resemble different structures, for instance different buildings, vehicles and the like. Unless the landscape or the like that can be simulated by means of the structural-foam elements can be accommodated to the different structures that are being built by the child with the assembly kit, the child is likely to quickly lose interest. For example, when the assembly kit has been previously used to erect dock structures and buildings of a harbor scene and the structural foam elements have been used to simulate quays and the like, the game will lose all interest for a child who subsequently assembles the elements of his toy building kit into houses of a mountain village and finds himself unable to similarly convert the harbor scene erected with the aid of the structural foam elements into a scene that is more in keeping with a mountain village, that is, for example, surrounding mountains.

SUMMARY OF THE INVENTION

Accordingly, it is a general object of the invention to overcome the disadvantages of the prior art.

More particularly, it is an object of the present invention to provide a method of releasably connecting structural-foam elements with one another.

Another object of the invention is to provide a connector for effecting such a connection of structural foam elements.

In keeping with these objects, and with others which will become apparent hereafter, one feature of the invention resides in a method of connecting elements made of structural foam, which method comprises the steps of providing a connector having two connected elongated blade-shaped connecting portions which are each provided with a transverse hole, pressing each of the connecting portions into one of the structural-foam elements until the hole is located within the element, and thereupon pushing an elongated locking member into each of the structural foam elements and through the respective hole, so that the locking member locks the associated connecting portion against undesired withdrawal from the respective structural-foam element.

The connector according to the present invention can be used for carrying out the method, and can be readily produced of synthetic plastic material.

By forming the connecting portions of the connector of a blade-shaped configuration, that is resembling a knife blade, they will readily penetrate into the foam material of the structural-foam elements, cutting through the foam structure so that in the region of entry there will be no crumbling of the foam material as would be the case if blunt elements were pushed into the foam. This is advantageous, because if crumbling were to be allowed, the elasticity and frictional engagement of the foam material with the connecting portions would be lost, and this would eliminate one of the important factors which serve to retain the connecting portions in the structural-foam element. Since the connecting portions of the connector according to the present invention do not cause such crumbling, the elasticity and frictional engagement of the foam material with the connecting portion are preserved. Furthermore, due to the fact that the connecting portions in effect form a narrow slit-like incision in the material of the structural element, the visible damage at the exposed surface of the structural element is kept to a minimum.

The locking members are pin-shaped or nail-shaped, and can be of metallic material or of synthetic plastic material. It is advantageous if they are of substantially X-shaped or cross-shaped cross-section.

Particularly in the erecting of landscapes or the like for toy or modelling applications, the present invention is of considerable importance because in such uses the structural-foam elements are almost invariably connected for only a relatively brief period of time, and must be subsequently disengageable from one another so that they can be re-assembled in a different way. The present invention makes this readily possible, and not only permits a rearrangement of the components at will, but also the addition or subtraction of components at any desired location of an erected structure.

An abutment flange may be located between the connecting portions of the connector, to abut the two structural-foam elements that are being connected and to limit the extent to which the respective connecting portions can be pushed into them. This means that the connecting flange assures that the two connecting portions (there could of course be more than two) of the connector are each inserted into its respectively associated structural-foam element to the same depth.

By having the locking members of X-shaped or cross-shaped cross-section, I assure that they can be readily pushed into the structural-foam elements, while on the other hand doing the least possible damage in terms of causing the material to crumble or causing large visible holes at the exposed surfaces of the elements.

The locking members may be provided with a head which serves to make it easier to push them into the respective structural element and also to pull them out again, and with a tip which of course aids in penetration.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a fragmentary section through two structural-foam elements which are connected by a connector according to the present invention; and FIG. 2 is a perspective illustrating the connector according to the present invention in one embodiment.

DESCRIPTION OF THE PREFERRED EMBODIMENTS

FIGS. 1 and 2 show a connector according to the present invention and the manner in which it is used to connect two structural-foam elements together.

The connector is generally identified with reference numeral 1 and has two connecting portions 2a and 2b which are blade-shaped, that is which generally resemble a knife blade. These connecting portions are in the illustrated embodiment located in a common plane and are joined by a portion 5 which constitutes an abutment flange for the structural-foam elements to be connected. Each of the blade-shaped connecting portions 2a, 2b is formed with a tip 4 which facilitates its penetration into the structural-foam element, and it may be further formed with a relatively sharp edge resembling a knife edge, but which must of course not be so sharp as to constitute a danger of injury to a user. Further, each of the connecting portions 2a, 2b is provided with one or more (two shown for each connecting portion) transverse holes 6. The connector further includes two or more (two shown in FIG. 1 and one shown in FIG. 2) elongated locking members 7 which generally resemble nails, and which as in the illustrated embodiment may be of X-shaped or cross-shaped cross-section and have a tip 8 to serve in facilitating their penetration, and a head 9 by means of which they can be pushed into and pulled out of a respective structural-foam element.

It should be understood that more than two of the connecting portions 2a, 2b could be provided, and that they need not necessarily be located in a common plane, but that for instance the connecting portions 2a and 2b might include an angle with one another, being located either in a common plane or not being located in a common plane. Also, the connecting portions could be provided as shown in FIG. 2, and one or more additional connecting portions could be added, extending at right angles to the ones that are illustrated.

FIG. 1 shows two structural-foam elements 3a, 3b, for instance of the type known as "Styrofoam", connected by the connector 1 according to the present invention. For this purpose, each of the connecting portions 2a, 2b is pushed into one of the structural-foam elements 3a, 3b, and the extent of penetration is determined by the presence of the abutment flange 5. When the penetration has taken place, the holes 6 will be located within the material of the structural-foam elements 3a, 3b, and thereupon at least one of the locking elements 7 is driven into one of the holes 6 of the respective connecting portion 2a, 2b, as shown in FIG. 1. For this purpose the tip 8 is placed against the respective structural-foam element 3a and pressure is exerted upon the locking member 7, for example upon the head 9 thereof, causing it to penetrate the material of the structural-foam element 3a or 3b and to pass through one or the other of the holes 6. It is clear that when this is accomplished for both of the connecting portions 2a, 2b, the connector 1 will reliably connect the two structural-foam elements 3a, 3b to one another. On the other hand, it is a simple matter to disconnect the structural-foam elements merely by removing the locking members 7, that is by pulling them out, whereupon the structural-foam elements 3a, 3b can be reassembled with one another or with other structural-foam elements in any other desired manner.

The present invention therefore eliminates the need for permanent adhesive connections between structural-foam elements and overcomes the disadvantages of the prior art.

It is self-evident that the invention is not limited to the toy art, but could be utilized in other connections, for instance in the model-building field.

It will be understood that each of the elements described above, or two or more together, may also find a useful application in other types of constructions differing from the types described above.

While the invention has been illustrated and described as embodied in a connector for structural-foam elements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A connector for elements made of structural foam, comprising a first and a second elongated planar blade-shaped connecting portion having tips, each of said connecting portions having cutting edges adapted to cut a slit-like incision into the structural foam elements as said connecting portions penetrate therein, said connecting portions being connected with one another and each having at least one hole extending transversely of its elongation; a pair of elongated locking members each adapted to be driven into one of said structural foam elements and through one of said holes, so as to extend transverse of the respective connecting portion and lock the same to the structural foam element; and an intermediate portion located between and connected with said correcting portions and forming an abutment flange for said structural foam elements, said cutting edges diverging continuously from said tips to said intermediate portion so that said connecting portions can penetrate and be extracted from said structural foam elements via said slit-like incision without causing crumbling of the latter.

2. A connector as defined in claim 1, wherein said locking members are substantially rod-shaped.

3. A connector as defined in claim 1, wherein said locking members have substantially cross-shaped cross-sections.

4. A connector as defined in claim 1, wherein said locking members have one end provided with a tip, and another end provided with a head.

5. A connector as defined in claim 1, wherein said connecting portions are located at least substantially in a common plane.

6. A connector for elements made of structural foam, comprising a first and a second elongated planar blade-shaped connecting portion having tips, each of said connecting portions being connected with one another and having planar cutting edges located at least substantially in a common plane with said planar connecting portions, and each having at least one hole extending transversely of its elongation; a pair of elongated locking members having substantially cross-shaped cross-sections, each adapted to be driven into one of said structural foam elements and through one of said holes, so as to extend transverse of the respective connecting portions and lock the same to the structural foam element; and an intermediate portion located between and connected with said connecting portions and forming an abutment flange for said structural foam elements; and an intermediate portion located between and connected with said connecting portions and forming an abutment flange for said structural foam elements, said cutting edges diverging continuously from said tips to said intermediate portion so that said connecting portions can penetrate and be extracted from said structural foam elements via said slit-like incision without causing crumbling of the latter.

* * * * *